May 30, 1933.  J. C. HEINTZ  1,911,894
INTERNAL REPAIR VULCANIZER

Filed May 16, 1930

INVENTOR
JAMES C. HEINTZ

BY

Ely & Barrow
ATTORNEYS

Patented May 30, 1933

1,911,894

UNITED STATES PATENT OFFICE

JAMES C. HEINTZ, OF LAKEWOOD, OHIO

INTERNAL REPAIR VULCANIZER

Application filed May 16, 1930. Serial No. 452,898.

The present invention relates to the vulcanization of tire repairs and particularly to the vulcanization of internal repairs, it being an object of the invention to provide a device for the purpose which is simple and extremely effective. It is also an object of the invention to provide a device of this character which will apply the heat and pressure directly to the interior surface of the tire to be repaired, and by which the heat at that point can be controlled so as to avoid irregularities in vulcanization.

It is a further object of the invention to provide an internal heating pad which can be attached to the usual sectional air bag, and which may be applied and removed therewith, and which will always be located in correct position within the tire. The construction of the flexible heating pad which is interposed between the tire and the air bag is superior to earlier forms of internal heating devices. By the perfection of the invention it is possible to perform internal repairs in automobile tires with electrical heating means, and thus to obviate the usual steam arms. The pressure is applied with the improved equipment directly to the interior of the tire rather than from the exterior thereof as is necessary in the heated arm type of vulcanizer.

It is also possible to utilize the yielding pressure obtainable by the use of sectional air bags in conjunction with electrical heating equipment on the interior of the tire. These objects are accomplished without excessive heating of the sectional air bags so that the life of such bags is lengthened.

Other objects and advantages will be apparent from the detailed description of the apparatus shown and described herein, it being understood that exact conformity with the detailed construction and description is unnecessary for the realization of the advantages of the present invention. Changes and modifications may be made in the invention and such as fall within the scope of the invention are intended to be covered herein.

In the form of the invention shown herein a sectional cavity vulcanizer of any usual or preferred type is shown at 1. This may be jacketed for the circulation of steam as shown, or it may be electrically heated if desired. The tire is indicated at 2, the cavity mold, if desired, being provided with non-skid forming means as is understood in the art. The usual bead rings are indicated at 4 being provided with pads 5 through which clamping pressure may be applied through any of the usual devices for this purpose.

An air bag of the internal pressure type is shown at 6, this bag being made of rubber or rubber and fabric, and provided with a valve stem 8 through which fluid pressure is admitted to the bag during vulcanization. Straps for lifting the bag out of the tire are shown at 9. If excessive heat is applied to bags of this type they will have a comparatively short life, and it is one of the objects of the invention to construct and devise a heating pad or element which may be inserted between the bag and the tire, and which will apply the required heat to the tire with as little injury to the bag as possible. This will also give a uniform curing temperature.

Figure 3:
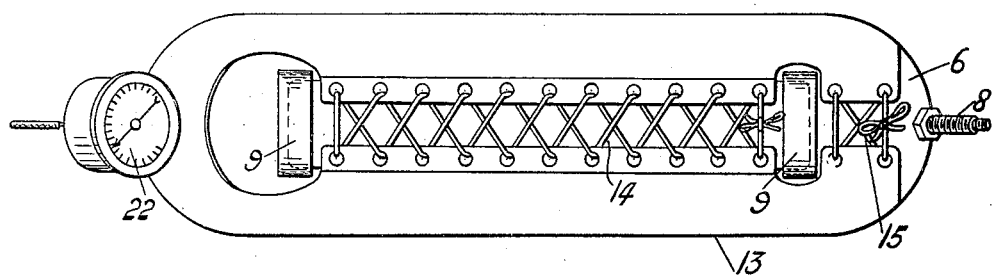
Figure 3 is a plan view of the parts shown in Figure 2.
Figure 2:
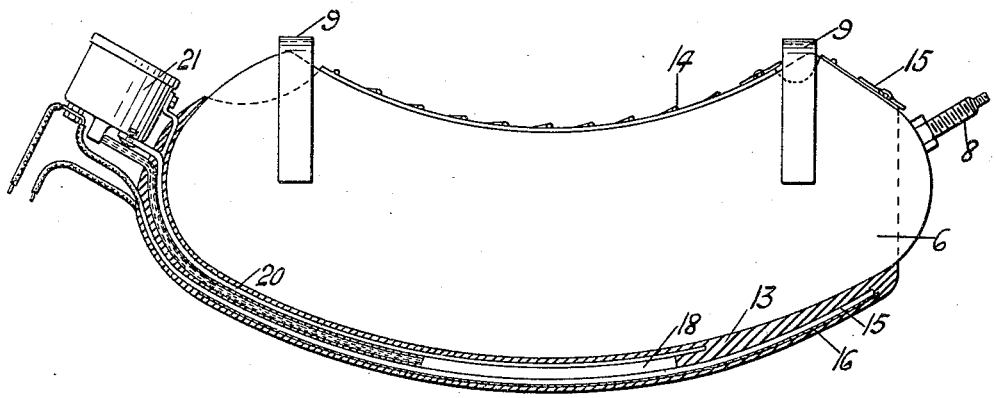
Figure 2 is a longitudinal section through the air bag and internal heating element.
Figure 1:
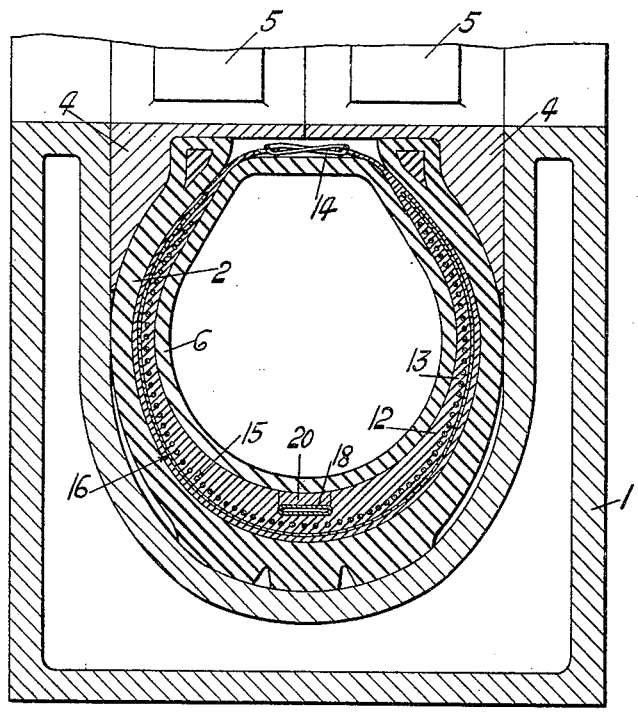
Figure 1 is a cross sectional view through a sectional cavity mold with the tire and improved internal vulcanizing appliances located therein.

The heating pad or jacket is indicated as a whole at 12 and comprises a rubber sheath 13 which is intended and designed to fit over and enclose the bag, being held around the bag by straps or lacing as indicated at 14. It will be noticed that one end of the jacket is substantially closed as shown at the left in Figure 2, and the opposite end is adapted to be laced as at 15 after the air bag is inserted. The removable jacket makes it possible to handle the bag and jacket as a single element and thereby assure the accurate placement of the jacket. It enables the air bag or jacket to be replaced and makes it practicable to use the air bag without the heating jacket if desired. The closed end of the jacket also supports the heat regulating devices as will be understood.

The jacket is composed in the main of rubber, and is thereby flexible to a sufficient extent to transmit the pressure from the air bag directly to the tire. Embedded within the rubber wall is a flexible coil of electrical resistance heating wire 15, which is preferably located as near the outer surface of the bag as is practicable, so that the heat therefrom will penetrate to the tire to a greater extent than to the air bag, and as the rubber in the jacket is a well known heat insulator it will be found that the thicker wall toward the bag will insulate it to a considerable degree.

In order to reinforce the jacket and assist in the conduction of heat to the exterior surface thereof, rather than to the interior surface, a wire mesh screen 16 may be interposed between the heating coil and the exterior of the bag. This screen is sufficiently flexible so as not to interfere with the flexibility of the jacket or to prevent the uniform transmission of pressure from the bag to the tire.

Embedded at some midway point in the jacket is a bulb 18 which is supported on an arm 20 extending to the closed end of the jacket where it supports a temperature indicating and control device 21 with an indicator 22 thereon, operated from the bulb. The bulb is filled with an expansible fluid which may control the current to the heating coil varying it or turning it on or off as required to maintain the temperature constant, one lead wire of which may be associated with the control device. By embedding the temperature control device within the jacket, the temperature of vulcanization is efficiently and accurately controlled, so that the vulcanization is always at a uniform temperature, regardless of the conditions to which the tire may be subjected. The automatic temperature control is an important feature of the invention, and makes the heating pad effective and operative.

The operation of the device will be understood from the description. It is possible by the use of this apparatus to obtain a uniform fluid pressure on the interior of the tire with the application of heat directly to the interior thereof, a result which has not been accomplished heretofore. The advantages of this improvement are apparent to those skilled in the art to which this invention pertains, and it will be seen that the invention is not necessarily limited to details thereof. In the use of the term "air bag" as applied to the part 6 any of the usual types of air bags may be employed, and the inflating medium may be air, water or any other fluid such as commonly employed. The rubber surface on the exterior of the bag is smooth and will not mark the interior surface of the tire. In place of the lacing any suitable fastening means may be employed along the edges of the jacket.

What is claimed is:

1. The combination with a cavity mold in which a tire is adapted to be placed, an air bag within a tire in the mold, clamping means to hold the bag and tire in the mold, means to apply fluid pressure to the interior of the bag, a rubber jacket surrounding the bag, a resistance coil embedded within the jacket, and a flexible wire screen between the coil and the exterior surface of the jacket.

2. The combination with a cavity mold in which a tire is adapted to be placed, an air bag within a tire in the mold, clamping means to hold the bag and tire in the mold, means to apply fluid pressure to the interior of the bag, a rubber jacket surrounding the bag, a resistance coil embedded within the jacket adjacent the exterior surface of the jacket, and a flexible wire screen between the coil and the exterior surface of the jacket.

3. A jacket adapted to be placed around a sectional air bag, said jacket being flexible and having a closed end, an open end and a fastening means along the edges of the jacket.

4. A jacket adapted to be placed around a sectional air bag, said jacket being flexible and having a closed end, an open end and a fastening means along the edges of the jacket, and flexible heating elements embedded within the wall of the jacket.

5. A jacket adapted to be placed around a sectional air bag, said jacket being flexible and having a closed end, an open end and a fastening means along the edges of the jacket, and flexible heating elements and temperature control means embedded within the wall of the jacket.

6. A jacket adapted to be placed around a sectional air bag, said jacket being flexible and having a closed end, an open end and a fastening means along the edges of the jacket, and flexible heating elements embedded within the wall of the jacket adjacent the outer surface thereof.

7. A jacket having the transverse and longitudinal curvature of an air bag, one end of the jacket being closed to fit the end of the bag, fastening means along the inner edges of the jacket, and a heating element located in the wall of the jacket.

8. A jacket having the transverse and longitudinal curvature of an air bag, one end of the jacket being closed to fit the end of the bag, fastening means along the inner edges of the jacket, and a wire coil located in the wall of the jacket.

9. The combination with a cavity mold in which a tire is adapted to be placed, an air bag within a tire in the mold, clamping means to hold the bag and tire in the mold, means to apply fluid pressure to the interior of the bag, a rubber jacket surrounding the bag, a resistance coil embedded within the jacket, and a fastening means for connecting the edges of the jacket to secure said jacket to said air bag.

JAMES C. HEINTZ.